United States Patent [19]

Jackson

[11] 4,307,571
[45] Dec. 29, 1981

[54] DEVICE DRIVEN BY HEAT ENERGY

[76] Inventor: Robert E. Jackson, P.O. Box 1090, Rialto, Calif. 92376

[21] Appl. No.: 61,477

[22] Filed: Jul. 27, 1979

[51] Int. Cl.³ .......................... F03G 7/02; F03G 7/06
[52] U.S. Cl. ................... 60/641.15; 60/527; 60/641.13; 60/530; 60/675; 185/7
[58] Field of Search ............ 60/527, 530, 531, 641 A, 60/641 AD, 641 AB, 676, 675; 185/4, 6, 7, 27, 32, 33

[56] References Cited

U.S. PATENT DOCUMENTS

| | | | |
|---|---|---|---|
| 1,055,439 | 3/1913 | Anderson | 60/527 |
| 2,878,641 | 3/1959 | Decker | 60/527 |
| 4,006,594 | 2/1977 | Horton | 60/641 AD |
| 4,236,377 | 12/1980 | Weinert | 60/641 AD |

FOREIGN PATENT DOCUMENTS 137424 12/1902 Fed. Rep. of Germany ........ 60/641 AD

Primary Examiner—Allen M. Ostrager
Assistant Examiner—Stephen F. Husar
Attorney, Agent, or Firm—John H. Crowe; Fred N. Schwend

[57] ABSTRACT

A rotatable device having outwardly extending weighted arms of thermally expandable material is supported for rotation about an axis arranged at an angle to the vertical. The device is exposed to the sun or other source of radiant energy, causing the arms to expand lengthwise. A sun shield is provided over a portion of the area of movement of the arms so that when they move out of the shade of the shield, they expand lengthwise and whey they move into such shade, they contract. The resultant differential lengthening of the arms establishes an unbalance of moments of gravitational force in the arms to thereby apply a continuous torque to the assembly.

5 Claims, 10 Drawing Figures

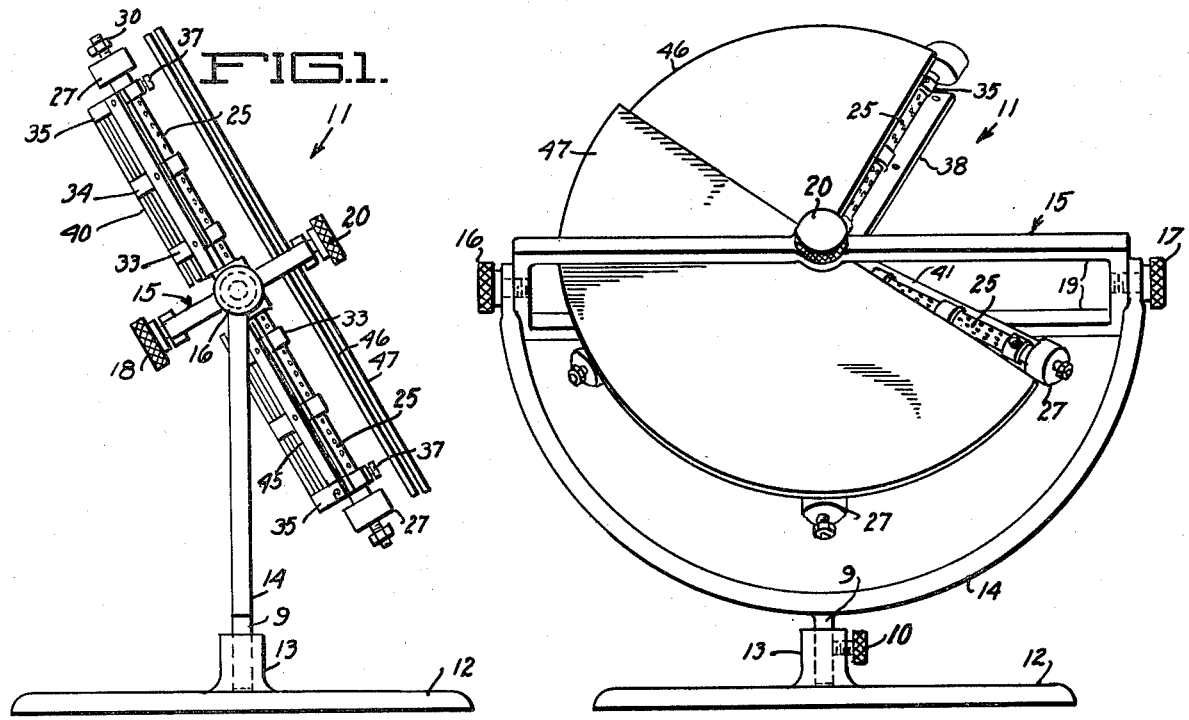
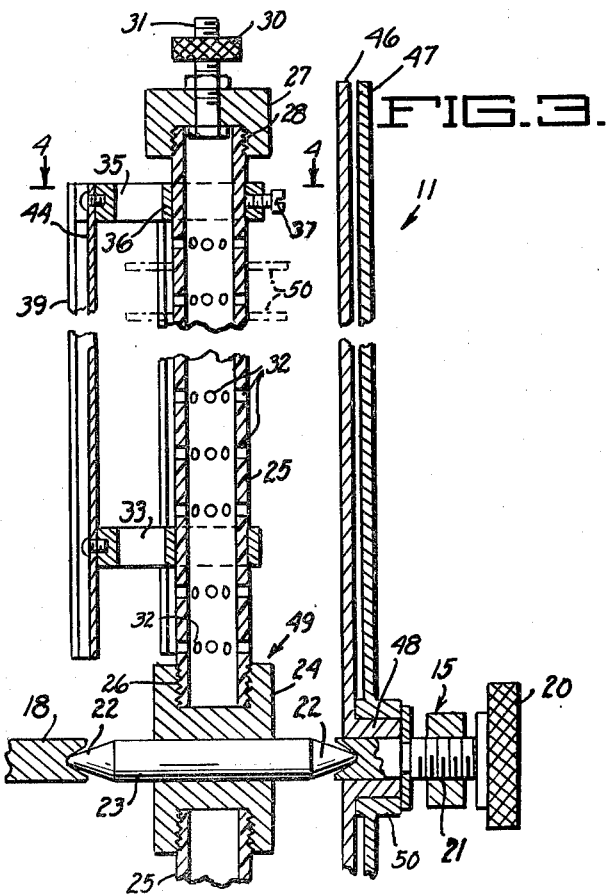
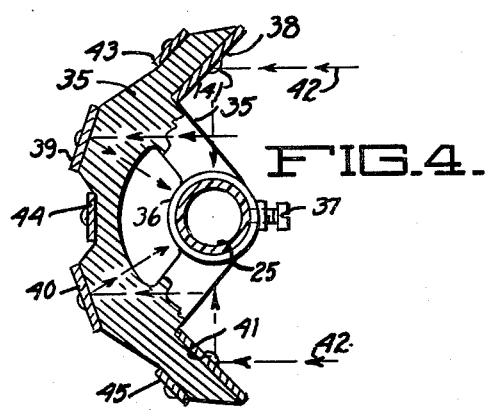

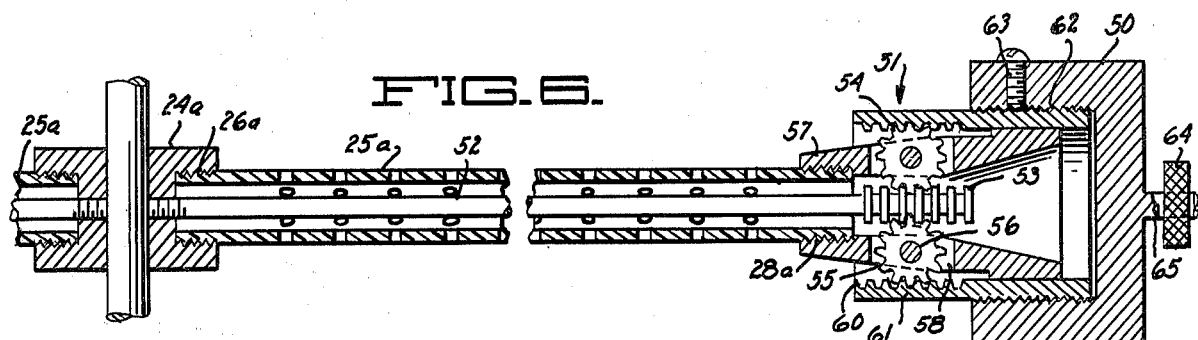
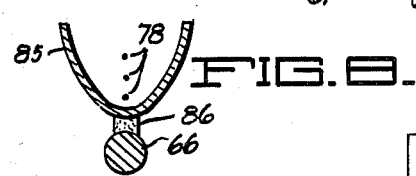
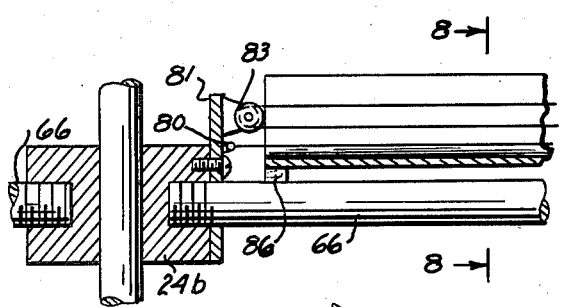
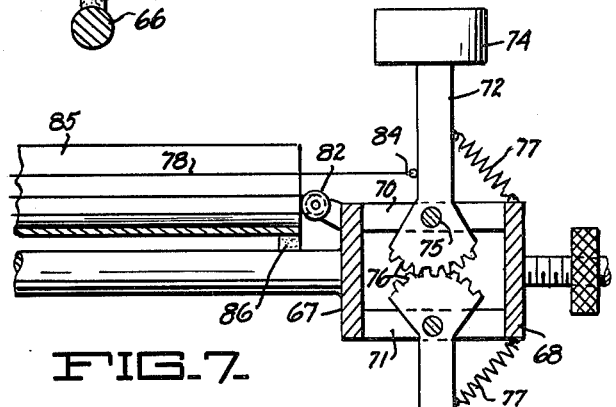
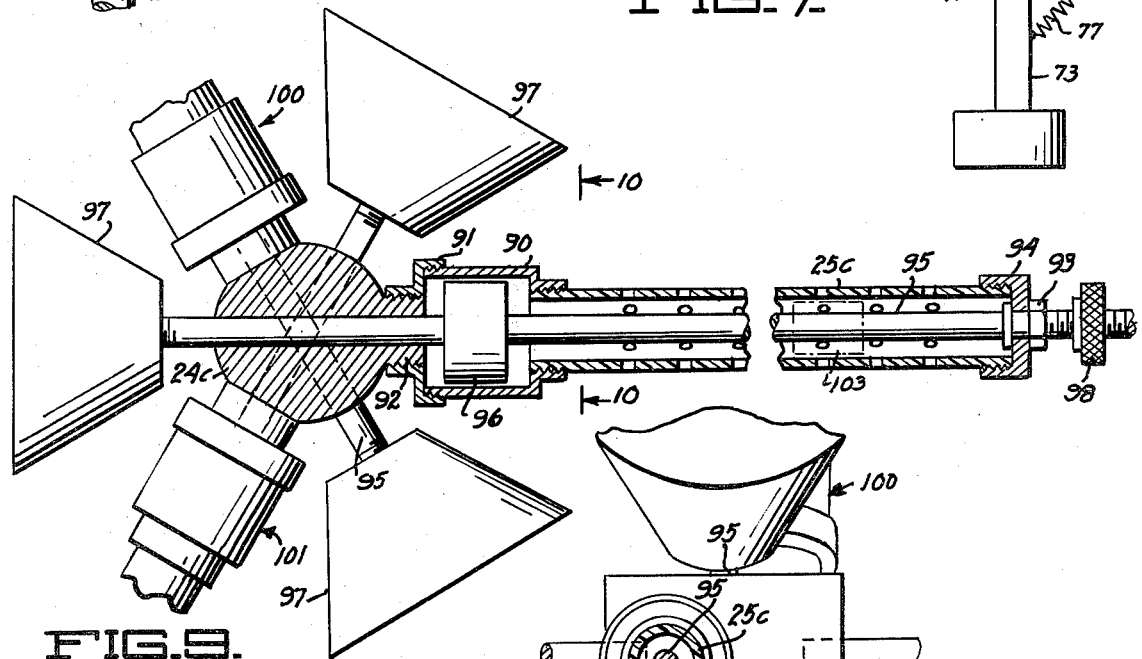
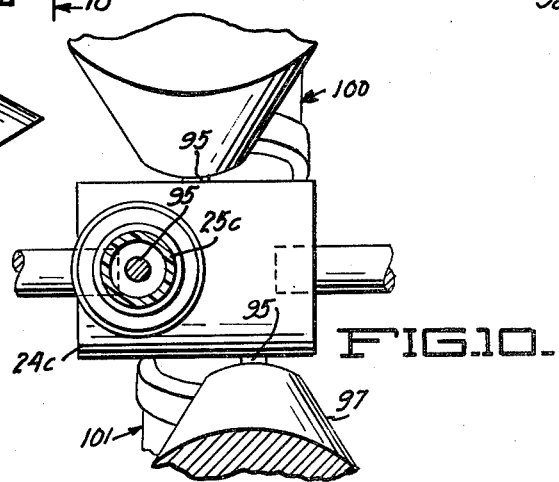

DEVICE DRIVEN BY HEAT ENERGY

BACKGROUND OF THE INVENTION

1. Field of the Invention

This invention relates to rotatable devices and has particular reference to devices which are rotated by heat energy, such as radiant energy derived from the sun or other sources.

SUMMARY OF THE INVENTION

A principal object of the present invention is to provide a rotatable device which utilizes the thermally expansive properties of a material to drive the device.

Another object of the invention is to provide a rotatable device having a rotor which is rotated by different moments of gravitational force created by a plurality of weighted arms extending from the rotor, the different moments being obtained by differentially heating and thereby expanding or contracting different ones of the arms lengthwise.

Another object of the invention is to provide a rotatable device of the above type in which radially movable weights are provided to produce unbalanced moments of gravitational force, the weights being movable by thermally expandable members through movement multiplying means.

According to the basic aspect of the invention, a rotor is supported for rotation about an axis arranged at an angle to the vertical. Outwardly extending, thermally expandable members are carried by the rotor. Such members are formed of a material having thermally expansive properties which will readily absorb the radiant energy of the sun or other source and transform the same to heat whereby to expand the members outwardly. A shield is provided to cover a portion of the area traversed by the members so that those members exposed to the radiant energy rays will expand outwardly to increase their moments of gravitational force whereas those shielded from the rays will contract inwardly to decrease their moments of gravitational force, resulting in an unbalance of forces capable of applying a rotational torque to the rotor.

According to another aspect of the invention, weights are carried by outwardly extending arms or the like and are moved radially of the rotor by thermally expansive-contractive elements through motion multiplying means.

The device may be made in a variety of different sizes and, in its smaller sizes, may be used as a scientific novelty item, while in its larger sizes, it may be used to perform useful work.

As a novelty item the device could be produced and packaged, unassembled, for home assembly.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a side elevation view of a rotatable device embodying a preferred form of the present invention, only two of the weighted arms being shown in alignment with each other for the sake of clarity, although there are actually five such arms.

FIG. 2 is a front elevation view of the device.

FIG. 3 is an enlarged sectional view through a portion of the device.

FIG. 4 is a sectional plan view taken along the line 4—4 of FIG. 3.

FIG. 5 is a diagramatic view illustrating the device and the relationship between the expandable arms and the shielding means.

FIG. 6 is a sectional view similar to FIG. 3, but illustrating a modified form of the invention. The reflector and sun shield are omitted for the sake of clarity.

FIG. 7 is a sectional view similar to FIG. 3, but illustrating another modified form of the invention. The sun shield is omitted for clarity.

FIG. 8 is a transverse sectional view taken along line 8—8 of FIG. 7.

FIG. 9 is a sectional view illustrating still another modified form of the invention, the reflector and sun shield being omitted for clarity.

FIG. 10 is a transverse sectional view of the embodiment shown in FIG. 9 and is taken along line 10—10 of FIG. 9.

Although this invention may be embodied in many different forms, there are shown in the drawings and will be described in detail certain specific embodiments, with the understanding that the present disclosure is to be considered as an exemplification of the principles of the invention and is not intended to limit the invention to the embodiments illustrated. The scope of the invention will be pointed out in the appended claims.

DESCRIPTION OF THE PREFERRED EMBODIMENT

Referring in particular to FIGS. 1 to 5, the rotary device is generally indicated at 11 and comprises a support base 12 having an apertured upstanding central boss 13 in which a depending stem 9 of a semicircular gimbal member 14 is removably secured by a set screw 10. A rectangularly shaped gimbal mount 15 is supported between the ends of the member 14 by coaxially extending pivot and clamp screws 16 and 17, permitting adjustment of the gimbal mount 15 into different angular positions relative to the horizon.

Coaxially extending bearing screws 18 and 20 are screw threaded through opposite side members 19 of the gimbal mount 15, intermediate their ends, as indicated at 21 (FIG. 3). The inner ends of the bearing screws 18 and 20 have conical bearing depressions formed therein to receive and rotatably support the opposite conical bearings 22 of a rotor shaft 23, the latter having a rotor hub 24 suitably secured thereon. The shaft 23 and hub 24 form part of a rotor generally indicated at 49.

A series of five equi-angularly spaced tubular arms 25 are threadedly attached at 26 to hub 24 and extend radially outwardly therefrom. Such arms are formed of a material having relatively high thermally expansive properties. For example, rigid polyvinyl chloride or other plastic has been found suitable for this purpose. The arms 25 are preferably black in color and have a dull black surface finish to readily absorb radiant energy waves of various wave lengths from the sun or other source of radiant energy and to transform such energy into heat effective to expand the arms lengthwise.

A weight 27, preferably of lead or other dense material, is threadedly secured at 28 to each arm 25.

In order to accurately balance the rotor, nuts 30 are threadedly mounted on bolts 31 which are secured to the weights 27 and extend axially outwardly from the arms 25. By moving the various nuts 30 along respective bolts 31, a fine adjustment of the balance of the motor can be made.

A pattern of evenly spaced holes 32 is formed in walls of the arms 25 along their lengths to enable circulation of air or other fluid in and out of the arms to effect a more rapid and thorough heating and cooling of the arms.

Reflecting means are provided to collect and reflect radiant energy rays onto the arms. For this purpose, three arcuate reflector mounts 33, 34 and 35 are provided for each arm. Each mount has a hub 36 slidably mounted over the respective arm 25, but the outer mount 35 is fixed to the arm by a clamp screw 37 threaded into its hub 36 and bearing against the arm.

As seen in FIG. 4, four reflectors 38, 39, 40 and 41 are secured to each of the mounts 33 to 35 by screws 141 in positions to reflect the radiant energy rays from the sun or other source in the directions indicated by arrows 42 onto different portions of the surface of each arm 25. Each of the reflectors is preferably formed of a stiff strip of plastic on which a thin sheet of aluminum foil is secured by means of a suitable adhesive to form a reflective surface. Stiff reinforcing strips 43, 44 and 45 are also suitably secured to the mounts 33 to 35.

It should be noted that, since the reflector unit, including the mounts 33, 34, 35 and the mirrors 38, 39, 40, 41 form an integral structure which is attached by the set screw 37 to the outer end of the arm 25, such unit will move along with the expansive or contractive movement of the outer end of the arm 25.

A pair of semi-circular shields 46 and 47 are provided to shield a portion of the sun's rays from striking the arms 25 when the latter are traversing a fixed portion of their rotational path. Both shields extend through substantially 180°. Shield 46 is formed with a bearing hub 48 which is mounted for pivotal adjustment on the shank of the bearing screw 20. Shield 47 is also provided with a bearing hub 50 which is mounted on the hub 48 for independent pivotal adjustment. Accordingly, the shields 46 and 47 may be adjusted to cover any portion of the circular path traversed by the arms 25, from 180° to 360°, and to cover any angular section of such path.

In the example shown in FIG. 5, the shields 46 and 47 are depicted as being adjusted to cover approximately 75% of the area of the path traversed by arms 25, leaving an exposed sector extending from approximately 45° clockwise of the meridian "a" to approximately 135°. In such condition, at least one arm 25 is always exposed to the rays of the sun or other source of radiant energy.

In operation, the gimbal member 14 and gimbal mount 15 are preferably angularly adjusted so that the axis of the rotor shaft 23 is substantially aligned with the sun. The sun's rays striking the exposed arm or arms 25 causes longitudinal expansion thereof to move its weight 27, together with the associated reflector unit, radially outwardly to thus increase the moment of gravitational force applied thereto. Concurrently, previously heated arms 25 which pass behind the shields 46 and 47 are cooled and thus contract lengthwise to move their weights 27 radially inwardly to thus decrease the moments of gravitational force applied to them. Therefore, an unbalance of forces exists, to create a continuous torque acting in a clockwise direction to rotate the rotor 49.

The shields 46 and 47 may be adjusted relative to each other to maintain the maximum amount of torque, depending on the intensity of the sun's rays, etc. Also, the gimbal mount 15 may be adjusted about both the horizontal and vertical axes of the device to obtain optimum exposure to the sun or other source of radiant energy. Also, by reversing the position of the shields 46 and 47 so that the arms 25 are exposed on the opposite side of the meridian "a", the rotor 39 may be caused to rotate in a counterclockwise direction.

In order to further enhance the cooling effect on the arms 25, thin heat transmission fins, depicted partly by dot-dash lines 50, may be attached at spaced increments along the lengths of the arms. Such fins are preferably formed of copper or similar metal having a relatively high coefficient of heat conductivity. Also, a jet 59 (FIG. 5) of cool air or other fluid could be directed against those arms 25 which are shielded by the shields 46 and 47 to further enhance the cooling effect on the arms 25. Further, a jet 69 of hot gas or a flame could be directed against those arms exposed to the sun or other source of radiant energy to enhance the heating effect.

Because of its aforementioned simple construction, the device may be sold in unassembled or kit form to be assembled by the purchaser.

DESCRIPTION OF THE FIRST MODIFIED FORM OF THE INVENTION

FIG. 6 illustrates a modified form of expandablecontractable arm assembly to be used in a device similar to that shown in FIGS. 1 to 5, in lieu of the arms 25.

A plurality of tubular arms having relatively high thermally expansive properties, one of which is shown at 25a, are threadedly secured at 26a to hub 24a and extend radially outwardly from the axis of rotation of the hub. Such arms are similar in construction to arms 25. A weight 50 of lead or the like is provided which is operably connected to the outer end of each arm 25a through a motion multiplying device generally indicated at 51 for causing a greater radial movement of the weight 50 than is effected by expansion and contraction of the arm 25a. For this purpose, a rod 52 of a material having relatively low thermally expansive properties, such as steel, is threadedly connected at its left hand end to the hub 24a. The rod extends coaxially through the arm 25a and terminates in a circular rack gear formation 53 which meshes with diametrically opposed pinions 54 and 55. The latter are rotatably supported by shafts 56 carried by an annular member 57 threadedly secured to the right hand end of the arm 25a at 28a. The pinions 54 and 55 are retained within slots 58 in member 57 and mesh with rack gear sections 60 formed in an annular sleeve 61, on which the weight 50 is threaded at 62. The weight 50 may be adjusted endwise relative to arm 25a for balancing purposes by screwing the same in or out a desired amount and then locking it in place by means of a lock screw 63. Additional fine balance adjustment may be accomplished by adjusting a weight nut 64 threaded on a stud 65 extending outwardly from the weight 50.

As the arm 25a becomes heated, it expands endwise relative to the rod 52 thus causing the pinions 54 and 55 to roll over the circular gear rack 53 and to advance the sleeve 51 and weight 50 endwise through twice the distance that the outer end of the arm 25a moves. This will appreciably increase the moment of gravitational force applied to the arm 25a over that obtained by the arms 25 of FIGS. 1 to 5. On the other hand, when the arm 25a passes in the shade of the sun shield, the cooling effect and consequent contraction of arm 25a will be transmitted to the weight 50 also at a rate equal to twice the movement of the outer end of the arm 25a.

Reflectors, not shown, similar to reflectors 38, 39, 40 and 41 of FIGS. 1 to 5 may be provided to concentrate the sun's rays onto each arm 25a.

DESCRIPTION OF THE SECOND MODIFIED FORM OF THE INVENTION

FIGS. 7 and 8 illustrate another modified form of the invention in which solid arms, one of which is shown at 66, are mounted on hub 24b in radially extending fashion in lieu of the arms 25.

Each arm 66 is formed of steel or other structural material having relatively low thermally expansive properties, and terminates at its outer end in an open box like configuration including spaced end walls 67 and 68 connected by bridge elements 70 and 71. Weight members 72 and 73, carrying weights 74 at the outer ends thereof, are pivotally supported at 75 on the bridge elements 70 and 71. Intermeshing gear sectors 76 are formed on the members 72 and 73 to cause concurrent pivoting of the members. Springs 77 are tensioned between the weight members 72, 73 and the outer wall 68 of rod 66 tending to rotate the members to carry the weights 74 radially outwardly relative to the hub 24b. Such movement, however, is resisted by a filament 78 of a material having relatively high thermally expansive properties. The filament 78 is attached at 80 to an anchor member 81 suitably secured to hub 24b. The filament 78 extends along the length of the rod 66 and is reeved over a sheave 82 rotatably supported from wall 67 of rod 66. The filament is reeved over a second sheave 83 rotatably supported from the member 81 and is finally attached at 84 to the weight member 72. A reflector 85, preferably having a parabolic shape in cross-section, as seen in FIG. 8, is supported by heat insulating stand-off brackets 86, attached to the rod 66 so that the three strands of the filament 78 are located adjacent the focal line of the reflector.

When the arm 66 moves into an unshaded area of the sun shield, where it is exposed to the sun's rays, the reflector 85 reflects the rays onto the strands of the filament 78 causing it to expand endwise, thus permitting the springs 77 to rock the weight arms 72 outwardly to thereby increase the moment of gravitational force applied to the arm. As the arm 66 moves into a shaded area under the sun shield, the filament 78 will contract endwise and thus return the weight arm 72 radially inwardly to decrease the moment of gravitational force.

It will be noted that the reflector 85 acts to shield the rod 66 from the sun's rays to thereby reduce any tendency for the arm 66 to expand endwise.

It will be obvious that additional sheaves, similar to sheaves 82 and 83, may be provided, enabling a greater length of filament 78 to be reeved thereover in additional strands to provide for a greater rocking movement of the weight members 72 and 73 when the filament expands endwise due to exposure to the sun's rays or contracts endwise when shielded from the sun's rays.

DESCRIPTION OF THE THIRD MODIFIED FORM OF THE INVENTION

FIGS. 9 and 10 illustrate another modified embodiment of the invention in which radially extending tubular arms 25c, similar to arm 25 of FIGS. 1 to 5, are provided, the arms 25c being formed of a material having relatively high thermally expansive properties. Each arm 25c is threadedly secured at its inner end to a cylinder 90 which, in turn, is threadedly secured to a cap member 91 which is threadedly secured to a boss 92 extending from hub 24c.

A rod 95 of a material, such as steel, having relatively low thermally expansive properties, extends through the center of each arm 25c and is attached by a nut 93 threaded thereon, to a cap member 94 threadedly secured to the outer end of the arm 25c.

The rod extends through a bearing hole in the hub 24c and has a cylindrical weight 96 attached thereto and movable within the cylinder 90. A second larger frusto-conical weight 97 is attached to the rod 95 on the side of the hub 24c opposite that of weight 96.

A weight adjusting nut 98 is threaded on the outer end of the rod 95 to facilitate proper balance of the assembly. As the arm 25c expands, the rod 95 will move both weights 96 and 97 to the right in FIG. 9, to provide an unbalance of gravitational moments tending to rotate the hub 24c in a clockwise direction.

One or more additional weights or alternative weights as indicated, for example, by dot-dash lines 103, can be attached at any position along the rod 95. On the other hand, the rod 95 can be made massive enough so that no weight or weights need be attached thereto.

It will be noted that other arm assemblies, generally indicated at 100 and 101, are equi-angularly mounted about the hub 24c. Although only three such assemblies are shown, more may be provided.

As noted in FIG. 10, the various arm assemblies 100, 101, etc., are spaced along the axis of the hub 24c so that the respective rods, i.e. 95, do not interfere with each other.

The arrangement shown in FIGS. 9 and 10 wherein the weights, i.e. 96 and 97, are located directly adjacent the hub 24c, reduces any bending strain on the arms 25c which would otherwise occur if the weights were supported at the outer ends of such arms. However, the same amount of differential gravitational force moments are obtained since it is the relative shifting movement of the weights 96 and 97 which determine the amount of torque, regardless of the distance of the weights from the axis of the hub 24c. From the foregoing, it will be observed that numerous variations and modifications may be effected without departing from the true spirit and scope of the invention. For example, other forms of movement multiplying devices than those shown in FIGS. 6 to 8 may be utilized, such as mechanical linkages, hydraulic motion transmission devices, etc. Also, according to the broader aspects of the invention, other means may be provided for heating and cooling different ones of the expandable arms or other elements, such as means for passing heating and cooling fluids through or along the arms. Further, thermally expandable contained liquids or gases may be used to shift the weights radially of the supporting hub. Also, in the embodiment shown in FIGS. 7 and 8, the filament 78 may be made of an electrical resistance wire material and the sheaves 82 and 83 electrically insulated so that an electric current could be passed through the filament to additionally heat the filament during the heating phase to augment the heating effect of the radiant energy. Such electrical heating could take place even while each arm passes through a portion of the shielded sector of its path.

Each of the aforementioned embodiments may be utilized to perform useful work by operatively connecting a work load to the rotor thereof.

It should be noted that in all of the aforementioned embodiments, any overall transient changes effecting one element, such as a weight or arm, will cause the same changes in all other elements as they rotate. For example, overall distortions due to heat, stress or strain, will effect all elements equally, and will not substantially cause changes in the relationships between the elements.

I claim:

1. A rotatable device comprising:

a rotor, means for supporting said rotor for rotation about an axis extending at an angle to the vertical, a plurality of elongate tubular members having a plurality of holes through the walls thereof supported by said rotor and extending outwardly from said axis, said members being effective to change their lengths upon being heated and cooled whereby to vary the moment of gravitational force thereof, said members being movable in a path exposed to rays from a source of radiant energy whereby to heat said members, and means for shielding a sector of said path from said rays whereby to cool certain of said members.

2. A rotatable device as defined in claim 1 wherein said members are comprised of rigid polyvinyl chloride.

3. A rotatable device comprising:

a rotor, means for supporting said rotor for rotation about an axis extending at an angle to the vertical, a plurality of elongate members supported by said rotor and extending outwardly from said axis, said members being effective to change their lengths upon being heated and cooled whereby to vary the moment of gravitational force thereof, said members being movable in a path exposed to rays from a source of radiant energy whereby to heat said members, means for shielding a sector of said path from said rays whereby to cool certain of said members, and means whereby the shielding means may be adjusted to vary the area of the shielded sector.

4. A rotatable device comprising:

a rotor, means for supporting said rotor for rotation about an axis extending at an angle to the vertical, a plurality of elongate members supported by said rotor and extending outwardly from said axis, said members being effective to change their lengths upon being heated and cooled whereby to vary the moment of gravitational force thereof, said members being movable in a path exposed to rays from a source of radiant energy whereby to heat said members, means for shielding a sector of said path from said rays whereby to cool certain of said members, and means for additionally heating certain of those of said members which are not shielded by the shielding means.

5. A rotatable device comprising:

a rotor, means for supporting said rotor for rotation about an axis extending at an angle to the vertical, a plurality of elongate members supported by said rotor and extending outwardly from said axis, said members being effective to change their lengths upon being heated and cooled whereby to vary the moment of gravitational force thereof, said members being movable in a path exposed to rays from a source of radiant energy whereby to heat said members, means for shielding a sector of said path from said rays whereby to cool certain of said members, and collecting means carried by said rotor for collecting the rays of radiant energy from said source and for directing the collected rays onto said members, said collecting means being rigidly attached to said members adjacent the outer ends only of said members whereby said collecting means move with said outer ends of said members.

* * * * *